May 23, 1961 W. D. WHITE 2,985,173
OPENABLE BINDER RINGS AND BOOK BINDERS
Original Filed Nov. 29, 1955 2 Sheets-Sheet 1
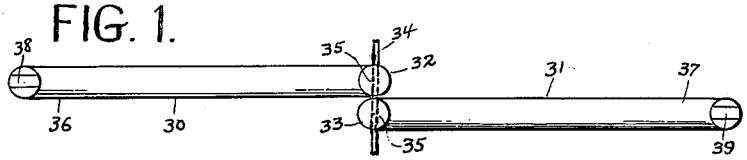
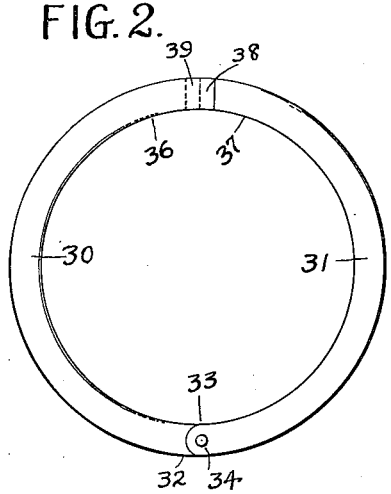
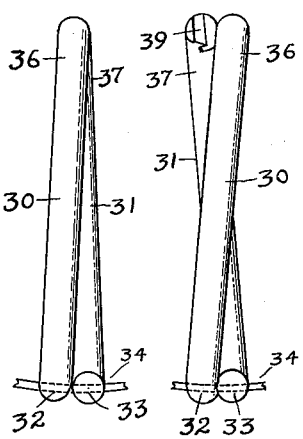
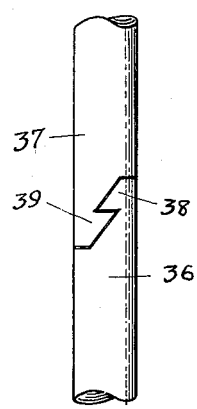
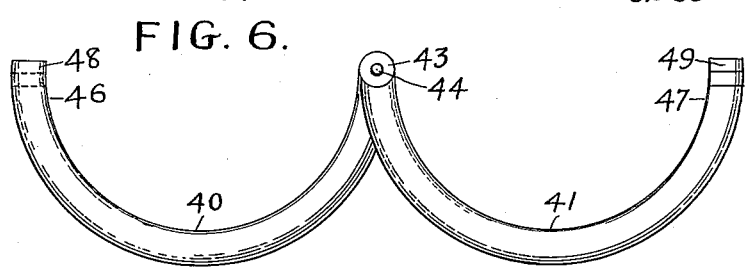
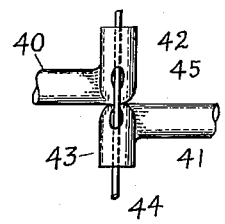
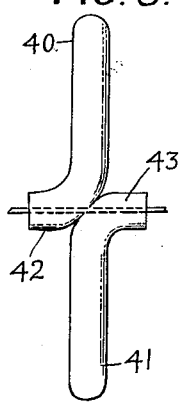
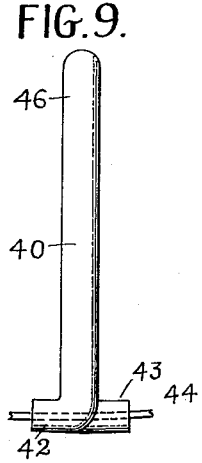
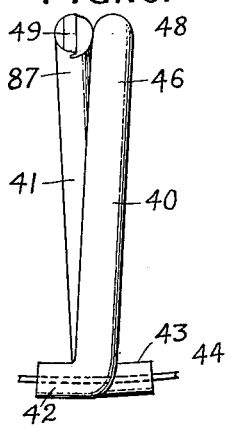
INVENTOR.
William D. White May 23, 1961  W. D. WHITE  2,985,173
OPENABLE BINDER RINGS AND BOOK BINDERS
Original Filed Nov. 29, 1955  2 Sheets-Sheet 2

INVENTOR.
William D. White

United States Patent Office 2,985,173
Patented May 23, 1961

2,985,173
OPENABLE BINDER RINGS AND
BOOK BINDERS
William D. White, 1110 Madison Ave., Greensboro, N.C.
Continuation of application Ser. No. 549,748, Nov. 29, 1955. This application July 2, 1959, Ser. No. 824,745
11 Claims. (Cl. 129—24)

This invention relates to improvements in openable binder rings and more particularly to such rings used for binding loose leaf books.

There has long been a need for such improvements. Conventional openable binder rings have many disadvantages. They cannot be easily combined into multi-ring binder units. They are usually hard to open and hard to close; they are often sprung and rendered useless; they permit pages to sag in covers; they permit pages to tear easily in turning; and are altogether unsatisfactory in the production of neatly bound loose-leaf books.

The widely used toggle-type binders are a vast improvement over conventional type single rings. They permit the production of neatly bound books. However, toggle-type binders use much metal. They are bulky. They are costly to produce.

This application is a continuation of my application, Serial No. 549,748, filed November 29, 1955, now abandoned.

One object of this present invention is to overcome disadvantages of both types of binders; to provide a rigid and durable ring that can be easily opened when opening is desired; that can be combined into multiple ring units so that the rings stand in approximately parallel planes, and at the same time a ring which, when used in multi-ring units, avoids the bulkiness and costliness of toggle-type binders.

Another object is to make it easy and inexpensive for printers to purchase binder units or binder unit parts, and without need for special binding machinery to loose-leaf bind books they have printed such as sales catalogues, sales presentations, special record books, etc.

Still another object is to make it easy to produce and market low-cost loose-leaf binder units and binder unit parts in many different sizes and styles, in 5 and 10 cent stores, stationery stores, etc., together with covers and loose leaves, with holes already prepared so that the buying public may purchase needed parts and make their own manuscript books, scrap books, etc.

A further object is to make it easier for blank book manufacturers to produce and market better books, in more variety and at lower cost.

Other objects and many of the attendant advantages of this novel ring will be readily appreciated as the same becomes better understood by reference to the following detailed description when considered in connection with the accompanying drawings wherein:

Fig. 1 is a top plan view illustrating one form of the present invention, with the individual ring elements extended in the open position;

Fig. 2 is a side elevational view, with the ring elements of Fig. 1 rotated to the closed position;

Fig. 3 is an end elevational view of Fig. 2;

Fig. 4 is an end elevational view of Figs. 2 and 3 illustrating exaggerated lateral disposition of the ring elements prior or subsequent to ring engagement;

Fig. 5 is an enlarged partial plan view of a releasable locking engagement of ring elements;

Fig. 6 is a side elevational view of a modified embodiment of the present invention, the ring elements extended in open position;

Fig. 7 is a partial plan view of the interconnection of the ring elements of Fig. 6 with the ring elements in the open position;

Fig. 8 illustrates the interconnection between the ring elements of Fig. 6 in the closed position;

Fig. 9 is an end elevational view illustrating the ring elements in the releasable locked position, substantially similar to Fig. 3;

Fig. 10 is an end elevational view similar to Fig. 9 prior to or subsequent to engagement of the releasable locking connection between the ring elements;

Figure 11:
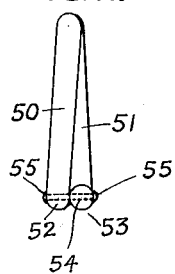
Fig. 11 is an end elevational view of a further modification of the present invention and constitutes a complete unit.

Referring to the drawings and particularly to Figs. 1 to 5 inclusive wherein there is illustrated one embodiment of the present inventive concept, the ring fastener comprises a pair of arcuate rigid ring parts or elements 30 and 31 pivotally connected to each other at the base ends 32 and 33 of each part, in abutting side-by-side relationship, for a short arcuate distance, by a resilient member 34, which member 34 is passed through openings 35 in the ring part ends 32 and 33. The clearance afforded by the openings 35 permits the resilient member 34 to pass freely therethrough; however, a snug fit is provided so that upon lateral tilting of one ring part relative to the other there will occur a responsive flexure of the resilient member between the elements. The free or exposed ends 36 and 37 of the ring parts are provided with suitable recesses that form interengageable hook-like projections 38 and 39 which projections cooperatively engage with each other to form a releasable locking connection (as is clearly shown in Fig. 5), when the ring elements are pivoted about the resilient member to form a closed ring. The projections 38 and 39 are on the outside faces of the ring parts. The term outside face or remote side shall refer hereinafter to that side of each ring part which is opposite from the side (not the proximate sides) abutting the side of the other ring part on the resilient rod.

As illustrated in Fig. 1, when ring parts 30 and 31 are in the open position, the resilient member 34 is in a relaxed unstressed condition. In this state the ring elements are free to rotate freely about the member 34. When the ring parts are moved to form a closed ring, the parts are pivoted substantially to a closed ring position with both arcuate parts remaining in substantially parallel planes. Then the free ends of the rigid ring parts are moved laterally so that the planes of the ring parts intersect, thereby subjecting the resilient ring connecting member 34 to a bending stress. The ring elements are pivoted a final amount and the ends lock in releasable engagement. In this locked position, the ring parts 30 and 31 are no longer so free to rotate easily on rod 34. The rod is under bending stress. Fig. 4 illustrates (an exaggerated) bend in the resilient member 34 in preparation for locking of hooks 38 and 39. Fig. 3 illustrates an exaggerated final bent form of the resilient member 34 after the hooks 38 and 39 are locked.

It will be readily apparent that the resiliency of the member 34 will tend to maintain the locking engagement of the ring parts as the resilient member tends to return to its initial linear condition. The member is preferably made of a suitable spring steel or other ferrous or non-ferrous material having the needed resilience.

Although it has been found that aluminum, steel, or brass ring parts are sufficiently rigid for normal use, other ferrous and non-ferrous materials including plastic materials having the requisite physical properties may also be used.

In Figs. 6 to 10 inclusive, there is shown a modification of the present invention. The arcuate ring parts 40 and 41 are pivotally connected to each other at their inner abutting ends 42 and 43 by the resilient rod supporting member 44. The free ends 46 and 47 are provided with releasable locking projections 48 and 49 similar to 38 and 39 illustrated in Fig. 5 and described above. Each ring part 40 and 41 has a base end 42 or 43 turned outward at approximately 90° to the plane of the arcuate ring part. Openings 45 as shown in Fig. 7 extending through base ends 42 and 43 are made to receive snugly the resilient member 44. It will be quite evident that the appendages 42 and 43 may encircle a greater length of the resilient member than do ends 32 and 33 in Fig. 1 and may produce a ring fastener having an increased tension locking connection between the free ends. The modified form, Figs. 6 to 10, also permits the ring parts to be aligned in substantially the same plane in closed ring position as illustrated in Figs. 8 and 9. Fig. 10 shows the ring parts tilted laterally away from each other (in exaggerated extent) to lock or unlock the hooks. This tilting further bends the resilient member. Figs. 8 and 9 show the ring parts in closed ring condition, the rod only slightly bent and the ring parts positioned in substantially a single plane.

Figure 12:
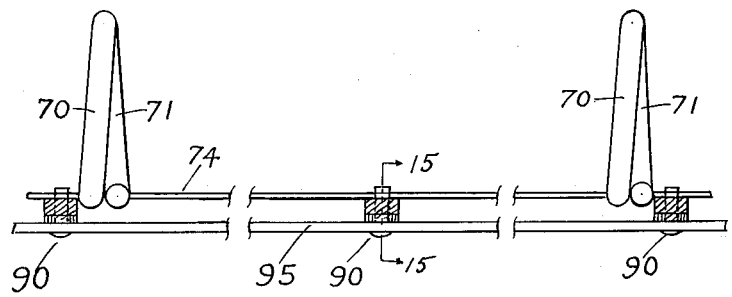
Fig. 12 illustrates a pair of ring elements of Figs. 1 through 4 as mounted on a supporting member which is connected to a book cover spine.

The embodiment of the ring fastener shown in Fig. 11 is substantially similar to Fig. 3 except that the resilient rod member 54 is braded or upset at ends 55 to prevent the ring parts 50 and 51 from coming off rod 54. Thus the ring parts are prevented from parting and they may be maintained permanently as a single ring fastener.

Where it is desirable to form a multi-ring loose leaf binder attached to the spine of a hook, a plurality of individual rings, as illustrated in Fig. 12, may be mounted on a single resilient rod member 74 so that the rings are maintained in substantially parallel spaced planes. The resilient rod member 74 on which the ring fasteners are mounted may be securely supported to the spine 95 of a book cover by means of the supporting posts 90 that are individually attached to the book spine by suitable fastening means, as illustrated in Figs. 15 and 16.

Figure 15:
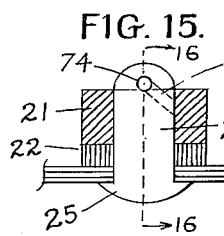
Fig. 15 is an enlarged sectional view taken substantially along the plane of line 15—15 of Fig. 12.
Figure 16:
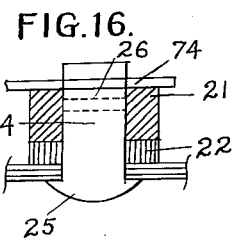
Fig. 16 is a sectional view taken substantially along the plane of line 16—16 of Fig. 15.

As is more clearly shown in Figs. 15 and 16 the post 90 has an enlarged head 25 and a stud portion 24 which stud portion is provided with an inclined opening 26 to receive and seat a resilient rod member 74 therein.

In assembling a multi-ring unit, such as shown in Fig. 12, the individual ring parts are initially assembled on the resilient member 74 spaced as desired. The stud 24 is passed through the opening in a binder spine 95 until the post head 25 is seated against the spine. A first washer 21 of flexible material, such as hard rubber, is placed over the stud 24. The resilient rod member 74 is then inserted into the inclined opening 26 of the stud 24 after which a second washer 22, preferably U-shaped to facilitate insertion, is positioned beneath the first washer in order to lift first washer 21 into stressed contact with the resilient rod 74. With the respective washers in place the resilient rod member is retained securely to the book spine. When it is desirable to remove the entire ring fastener assemblage it is only necessary to remove the U-shaped washer 22 from the post in order to permit the first washer 21 to be lowered and the resilient rod 74 to be removed from the opening 26.

Figure 13:
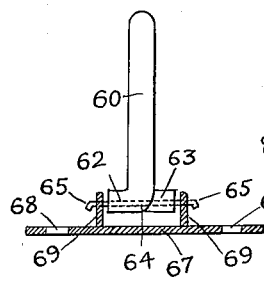
Fig. 13 is an end elevational view of the unitary ring elements substantially similar to Figs. 6 through 10.

In Fig. 13 there is shown a single ring fastener (of the type shown in Figs. 6 through 10) mounted on a resilient rod 64, said rod mounted on projections 69, the ends 65 of the resilient rod 64 being bent so as to retain the rod on the projections, said projections 69 being an integral part of base 67, said base having means, such as holes 68, permitting easy attachment to book covers or other materials.

Figure 14:
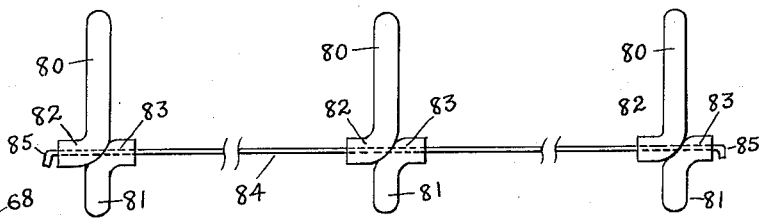
Fig. 14 is an end elevational view of a plurality of ring elements substantially similar to Figs. 6 through 10 as supported on a single member.
Figure 17:
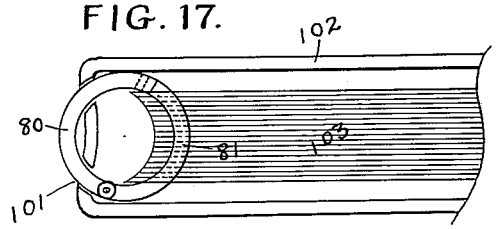
Fig. 17 is a side elevational view of a ring element incorporated within a book binder and having pages received thereon, said ring having ring parts of equal length.
Figure 20:
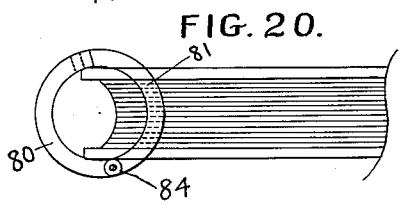
Fig. 20 is a side elevational view of a ring element largely exposed outside the two-piece cover members.
Figure 18:
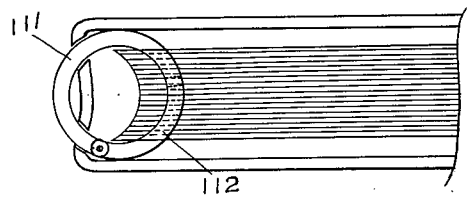
Fig. 18 is a side elevational view of a ring element supported within a binder and having loose leaf pages mounted thereon, with said ring having ring parts of unequal length.

In Fig. 14 multiple rings of the type illustrated in Figs. 6 through 10 are shown assembled on an elongated resilient rod 84. This multi-ring binder unit may be used to bind loose leaf pages and cover as shown in Figs. 17, 18 or 20. The ends 85 of resilient rod 84 may have means to prevent the ring parts from coming off rod 84. However, the upturned ends or other means are not absolutely necessary. When the free ends of the ring parts are locked to each other, the resilient rod is locked under tension to the base ends of the rings.

Figure 19:
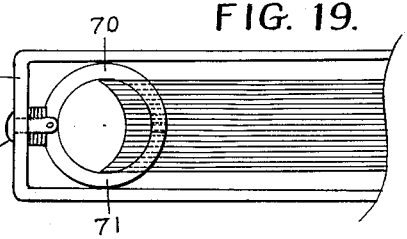
Fig. 19 is a side elevational view of a ring element supported to a spine of a book cover substantially similar to that illustrated in Fig. 12.

Figs. 17 to 20 inclusive illustrate various applications and variations to which the ring fastening elements may be employed. In Fig. 17 a ring fastener unit of the type shown in Fig. 14 is received through openings 101 in a flexible cover 102 to hold the loose leaf pages 103 between the front and back parts of the one-piece cover. Obviously as many rings as are desired may be employed. Fig. 18 illustrates the use of a ring fastener having unequal arcuate lengths 111 and 112 in the same environment as in Fig. 17. Fig. 19 depicts the use of a ring fastener shown in Fig. 12 supported to a binder spine 95 by means of a post 90. In the application illustrated in Fig. 19 the binder rings lie entirely within the covers. Fig. 20 illustrates the use of the ring fastener shown in Fig. 14 to hold loose leaf pages between a separated two-piece cover, this embodiment differing from the previously described embodiments wherein the rings are used with one-piece covers. It will be apparent that the binder rings may be substituted one for the other in each of the forms illustrated wherein the rings are used in multiples on a single elongated resilient rod or used singly.

Obviously, many modifications and variations may be made in the construction, shape and arrangement of the ring elements, the supporting brackets, and the resilient rod member, in the light of the above teachings, without departing from the real purpose and spirit of this invention. It is, therefore, to be understood that within the scope of the appended claims many modified forms of the present inventive concept as well as the use of alternatives and mechanical equivalents may be reasonably included and modifications are contemplated.

What is claimed is:

1. In a loose leaf binder, the combination of a rod and two cooperative ring parts mounted thereon, each of said ring parts having a releasable locking means at one end and a rod receiving opening at the other end, each of said ring parts in the unlocked condition being freely movable independently axially and rotatable on the rod, and in the locked condition said ring parts and rod being stressed precluding relative ring part and rod movement.

2. A ring fastener for use in combination with a book binder comprising at least one pair of ring parts cooperatively and releasably interengageable at one end of each, a rod, said rod rotatably receiving the other end of the ring parts thereon for slidable independent displacement in the ring unlocked condition, and in the locked condition said ring parts and rod being stressed precluding ring part and rod relative movement.

3. A ring fastener comprising two ring parts forming a closed ring, cooperating ring element locking means on one end of each of said elements for releasable locking engagement of the ring parts together at said one end, a rod for supporting the ring parts at their other ends, each of said ring parts, in the unlocked condition, being freely slidable and rotatable independently of each other on the rod, and in the locked condition said ring parts exert a bending stress on the rod precluding ring part rotation and slidable movement on the rod.

4. A ring fastener comprising two ring parts forming a closed ring, cooperating ring element locking means on one end of each of said elements for releasable locking engagement of the ring ends together, said cooperating means on each ring element being rotated adjacent to the terminal end of the ring part, a resilient rod for supporting said ring parts at the other ends thereof, each of said ring parts in the unlocked condition being freely slidable and rotatable independently of each other on the rod, and in the locked condition said ring parts exert a non-axial stress on said rod precluding ring part rotation and sliding movement on the rod.

5. A ring fastening element of the character described comprising two ring parts together forming a closed ring, releasable locking means on each of said ring parts for releasable locking engagement of the ring parts together at one end thereof, a resilient rod, said rod hingedly receiving the parts at their other ends with the ring parts being freely slidable axially and being rotatable on the rod in the unlocked condition, and in the locked condition said ring parts and rod being restricted from slidable and rotatable movement on the rod.

6. For use in a loose-leaf binder, a ring fastening element comprising two ring parts together forming a closed ring, cooperating releasable locking means on one end of each of said ring parts for releasable locking engagement of the ends together, and an elongated rod for hinging the parts together at their other ends, each of said ring parts being freely slidable and rotatable independently of each other on the rod in the ring unlocked condition, and in the ring locked condition said ring parts and rod being restricted from relative movement therebetween, and means for mounting the rod with the ring parts thereon in position on a loose-leaf binder.

7. A ring fastener comprising two ring elements together forming a closed ring, releasable locking means on one end of each of said ring elements for releasable locking engagement of said ends together, a resilient rod for hinging the elements together at the other ends, said ring elements being freely movable axially and independently on said rod, and in the locked condition, said ring parts being subjected to a stress and subjecting the rod to a non-axial stress binding the elements thereon and precluding axial movement of the ring part elements.

8. The combination of a ring element supporting rod and releasable interengageable ring elements, each of said ring elements having two ends, the free end having a releasable catch thereon and a captive end for mounting on said rod, said ring elements being freely rotatable and slidable axially independently of each other along said rod in the unlocked ring condition, and in the locked ring condition, said captive ends of the ring elements binding against the rod precluding relative displacement of the ring elements and the rod.

9. A book binder of the character described having a plurality of spaced apart pairs of ring fastening elements, each pair of ring elements having at one end of each element cooperating ring element releasable locking means and a rod receiving opening at the other end, a rod for pivotally receiving the ring elements thereon, said ring elements in the unlocked condition on said rod being freely slidable and rotatable independently of each other, and in the locked condition, said ring elements and rod being stressed sufficiently to preclude relative movement of the ring elements and rod.

10. A ring fastening element of the character described comprising two ring parts together forming a closed ring, releasable locking means on each of said ring parts for releaseable locking engagement of the ring parts together at one end thereof, a resilient rod hingedly receiving the parts at their other ends with at least one of the ring parts being freely slidable axially and being rotatable on the rod in the unlocked condition, and in the locked condition said ring parts being restricted from slidable and rotatable movement on the rod, said ring parts being subjected to a stress in conjunction with the rod in the locked condition.

11. In a loose leaf binder, the combination of a rod and two cooperative ring parts mounted thereon, each of said ring parts having a releasable locking means at one end and a rod receiving opening at the other end, at least one of said ring parts in the unlocked condition being freely movable independently axially and rotatable on the rod, and in the locked condition said ring parts and rod cooperating under joint stress precluding relative ring part and rod movement.

References Cited in the file of this patent
UNITED STATES PATENTS

| | | |
|---|---|---|
| 812,397 | Boehner | Feb. 13, 1906 |
| 857,377 | Baker | June 18, 1907 |
| 2,268,431 | Slonneger | Dec. 30, 1941 |